Figure 1:
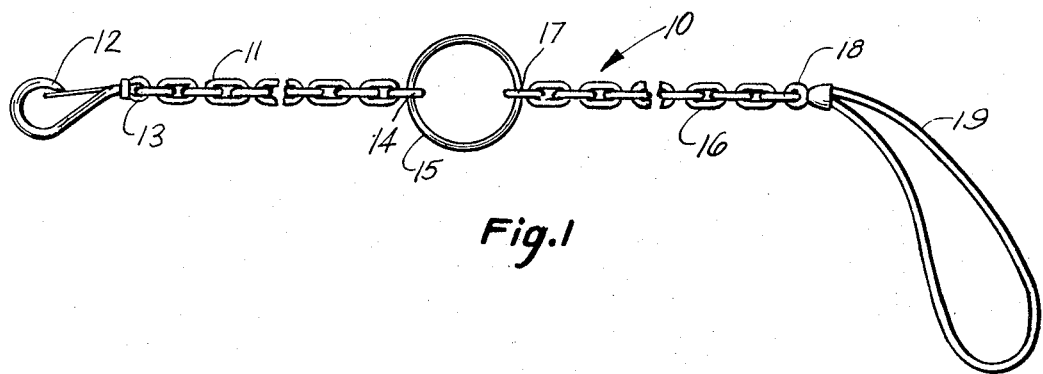

March 28, 1967  H. PETERLIN  3,311,088
TRAINING AND WALKING LEASH
Filed Feb. 21, 1966

INVENTOR.
Henry Peterlin

United States Patent Office 3,311,088
Patented Mar. 28, 1967

3,311,088
TRAINING AND WALKING LEASH
Henry Peterlin, 120 Harrington Road,
Clifton, N.J. 07012
Filed Feb. 21, 1966, Ser. No. 528,738
2 Claims. (Cl. 119—109)

This invention relates to dog training devices, and more particularly a training and walking leash.

It is therefore the main purpose of this invention to provide a training and walking leash adapted to train dogs of various sizes in a most effective manner without injuring them.

Another object of this invention is to provide a training and walking leash having a dual purpose, namely training and walking a dog.

Another object of this invention is to provide a training and walking leash wherein said leash is attached around the body of a dog in such a manner that the maximum control can be exercised over various parts of the dog's body.

Still another object of this invention is to provide a training and walking leash which is sturdy in construction, inexpensive to manufacture and provides maximum utility to its user.

Other objects and advantages of this invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

In the drawing:

FIGURE 1 shows the preferred embodiment of this invention.

Figure 2:
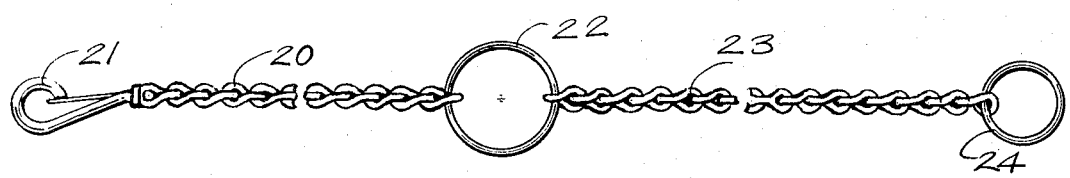

FIGURE 2 relates to a modified embodiment of this invention.

Figure 3:
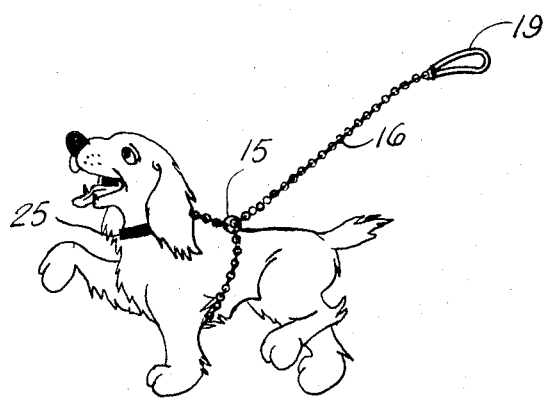

FIGURE 3 is a view illustrating a leash on a dog.

According to this invention, a training and walking leash 10 is provided with one chain portion 11. One end of chain portion 11 is designated as 13 and is flexibly attached to a snap hook 12. The other end of chain portion 11 is designated as 14 and is attached to circular ring 15. Chain portion 16 is substantially identical with the chain portion 11. One end 17 of chain portion 16 is flexibly secured with ring 15. The other end 18 of chain portion 16 is secured to the strap handle 19.

In operation, snap hook 12 is removably attached on collar 25 of a dog. Chain portions 11 and 16 are placed around the dog's body, then strap handle 19 and a portion of chain 16 is inserted through the ring 15 making a loop around the dog's body. As it can be seen from FIGURE 3, a dog may be made to sit by pulling the strap handle 19 into an upward direction.

In its modified form the invention relates to an arrangement consisting of chain portions 20 and 23, a ring 22 connecting said portions together and chain portion 20 being connected to snap hook 21. The other end of chain portion 23 is flexibly secured to ring 24 which is of smaller diameter than ring 22. In this embodiment ring 24 and a portion of chain 23 is inserted through ring 22 thus making a loop around dog's body.

It will also be noted that chain portions 11 and 16 as well as portions 20 and 23 are of conventional nature and may be replaced with other commercially obtainable chain portions. It is preferred, however, that chain portions 16 and 23 should be considerably longer than the portions 11 and 20 so that leash 10 can be conveniently used for the purpose of walking a dog.

What I now claim is:

1. Training and walking leash comprising, in combination, a pair of chain portions, a ring secured to one end of each of said chain portions for connecting said portions together, a snap hook secured to the free end of one chain portion, said snap hook adapted to be removably attached to a dog's collar, a handle secured to the free end of the other chain portion, said ring having an internal diameter greater than the width of said other chain portion and said handle, said training and walking leash in operative use adapted to have the snap hook secured to said dog's collar, said chain portions adapted to be placed around the body of said dog, with said handle and the free end portion of the other chain being inserted through said ring to make a loop around said dog's body and to provide a leash means.

2. The leash according to claim 1, wherein said handle comprises a second ring of relatively smaller size than the first said ring so to be receivable therethrough.

References Cited by the Examiner

UNITED STATES PATENTS

| | | | |
|---|---|---|---|
| 2,670,712 | 3/1954 | Patience et al. | 54—71 |
| 2,826,172 | 3/1958 | Buckle et al. | 119—96 |
| 2,859,732 | 11/1958 | Driscoll | 119—106 |

SAMUEL KOREN, *Primary Examiner.*

HUGH R. CHAMBLEE, *Examiner.*